(12) United States Patent
Xu et al.

(10) Patent No.: US 7,644,802 B2
(45) Date of Patent: Jan. 12, 2010

(54) PERFORMANCE FLOW GUIDE FOR IMPROVED ACOUSTICS

(75) Inventors: Mo Xu, Singapore (SG); YiRen Hong, Singapore (SG); WaiOnn Chee, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 263 days.

(21) Appl. No.: 10/630,207

(22) Filed: Jul. 30, 2003

(65) Prior Publication Data

US 2004/0084246 A1 May 6, 2004

Related U.S. Application Data

(60) Provisional application No. 60/423,314, filed on Nov. 1, 2002.

(51) Int. Cl.
*H02K 5/24* (2006.01)
*G11B 33/14* (2006.01)
*H02K 5/00* (2006.01)
*F16F 7/00* (2006.01)
*G11B 33/08* (2006.01)

(52) U.S. Cl. ............... 181/202; 181/207; 360/97.02
(58) Field of Classification Search .......... 181/202, 181/207, 201, 200; 360/97.02, 97.01, 97.03, 360/97.04; 720/651, 648
See application file for complete search history.

(56) References Cited

U.S. PATENT DOCUMENTS

| | | | | |
|---|---|---|---|---|
| 4,587,645 A | | 5/1986 | Wong | |
| 4,888,655 A | * | 12/1989 | Bonn | 360/97.03 |
| 5,034,835 A | * | 7/1991 | Yokoyama | 360/97.02 |
| 5,326,611 A | | 7/1994 | Kishita | |
| 5,696,649 A | * | 12/1997 | Boutaghou | 360/97.03 |
| 5,781,373 A | * | 7/1998 | Larson et al. | 360/97.02 |
| 6,005,768 A | * | 12/1999 | Jo | 361/685 |
| 6,008,965 A | * | 12/1999 | Izumi et al. | 360/97.03 |
| 6,097,568 A | * | 8/2000 | Ekhoff | 360/97.02 |
| 6,097,608 A | * | 8/2000 | Berberich et al. | 361/752 |
| 6,104,571 A | * | 8/2000 | Kabasawa | 360/236.4 |
| 6,116,373 A | * | 9/2000 | Dodd | 181/152 |
| 6,208,484 B1 | | 3/2001 | Voights | |
| 6,249,824 B1 | * | 6/2001 | Henrichs | 710/8 |
| 6,266,208 B1 | | 7/2001 | Voights | |
| 6,296,691 B1 | * | 10/2001 | Gidumal | 96/17 |
| 6,337,782 B1 | * | 1/2002 | Guerin et al. | 360/256.1 |
| 6,360,843 B1 | * | 3/2002 | Kim et al. | 181/207 |
| 6,549,365 B1 | * | 4/2003 | Severson | 360/97.02 |
| 6,594,108 B2 | * | 7/2003 | Naganathan et al. | 360/97.02 |
| 6,603,633 B2 | * | 8/2003 | Heaton et al. | 360/97.02 |
| 6,636,379 B2 | * | 10/2003 | Rannow et al. | 360/97.02 |
| 6,691,667 B2 | * | 2/2004 | Salameh | 181/204 |
| 6,724,566 B2 | * | 4/2004 | Kant et al. | 360/97.01 |
| 6,894,867 B2 | * | 5/2005 | Hong et al. | 360/97.02 |
| 6,914,742 B1 | * | 7/2005 | Fioravanti et al. | 360/75 |
| 6,940,687 B2 | * | 9/2005 | Hong et al. | 360/97.02 |
| 7,002,774 B2 | * | 2/2006 | Adams | 360/97.02 |

(Continued)

Primary Examiner—Edgardo San Martin
(74) Attorney, Agent, or Firm—Westman, Champlin & Kelly, P.A.

(57) ABSTRACT

Flow guides in the form of extensions that project internally from the housing of an electronic consumer device can contribute to undesirable noise emissions from the device. Proposed is an improved flow guide or extension that reduces propagation of flow induced vibrations to the housing, thereby improving the overall acoustic performance of the device.

20 Claims, 4 Drawing Sheets

U.S. PATENT DOCUMENTS

| | | | |
|---|---|---|---|
| 7,110,215 B2* | 9/2006 | Hong et al. | 360/97.02 |
| 2002/0075590 A1* | 6/2002 | Garikipati et al. | 360/97.02 |
| 2002/0093757 A1 | 7/2002 | Daniel | |
| 2003/0086208 A1* | 5/2003 | Hong et al. | 360/256.1 |
| 2003/0147175 A1* | 8/2003 | Tadepalli et al. | 360/97.02 |
| 2003/0156350 A1* | 8/2003 | Hong et al. | 360/97.02 |
| 2003/0197974 A1* | 10/2003 | Hong et al. | 360/97.02 |
| 2003/0202275 A1* | 10/2003 | Adams | 360/97.02 |
| 2003/0202276 A1* | 10/2003 | Smith | 360/97.02 |
| 2003/0210500 A1* | 11/2003 | Hong et al. | 360/256.1 |
| 2003/0218828 A1* | 11/2003 | Hong et al. | 360/97.02 |
| 2003/0218829 A1* | 11/2003 | Hong et al. | 360/97.02 |
| 2003/0231424 A1* | 12/2003 | Hong et al. | 360/97.02 |
| 2004/0012881 A1* | 1/2004 | Hong et al. | 360/97.02 |
| 2004/0212920 A1* | 10/2004 | Tadepalli et al. | 360/97.02 |
| 2005/0024763 A1* | 2/2005 | Ng et al. | 360/97.02 |
| 2005/0063092 A1* | 3/2005 | Xu et al. | 360/97.02 |
| 2005/0094313 A1* | 5/2005 | Kim | 360/97.02 |
| 2005/0185325 A1* | 8/2005 | Hur | 360/97.02 |

* cited by examiner

PERFORMANCE FLOW GUIDE FOR IMPROVED ACOUSTICS

CROSS REFERENCE TO RELATED APPLICATIONS

This application claims the benefit of U.S. provisional application No. 60/423,314, filed Nov. 1, 2002.

FIELD OF THE INVENTION

The present invention relates generally to improving the acoustic performance of electronic devices, and more particularly, but not by way of limitation, to structures or components that direct fluid flow in such devices.

BACKGROUND OF THE INVENTION

Products that generate less noise during operation are generally perceived as being superior to those that are noisy, even though the latter may outperform the former in other areas. Acoustic or noise control is therefore an important consideration in the design of many consumer products, examples of which include portable consumer electronics, personal entertainment systems, computers, and peripherals of such devices.

Vibration and noise may be induced by virtue of the way the product operates. This can be seen in a data storage device that includes a rotatable disc stack assembly in a housing. As the disc stack assembly rotates during drive operations, it drags along with it the surrounding air or fluid, thereby creating a movement of fluid within the housing. If the data storage device includes structure or devices that impede or redirect the fluid movement, fluid induced vibrations of the structure or devices may occur. Such vibrations may be amplified as they are transmitted to adjoining structure or devices. This contributes to the noise level of the data storage device, and thus adds to the overall noise level of the consumer product associated with the data storage device. Since the very structure and devices that resulted in the higher noise levels may be instrumental in improving the performance of the data storage device in other aspects, there is a need to provide for noise control without compromising the overall performance of the product.

The following provides examples of how the present invention provides a solution to meet this need while offering various other advantages to both the manufacturer and the consumer.

SUMMARY OF THE INVENTION

Embodiments of the present invention include an extension projecting from a part of a housing component, where the extension has an elastic surface. The elastic surface is provided to face anticipated impingement of fluid flow so that the extension does not suffer from severe flow induced vibrations. The extension may be wholly or substantially formed from one or more elastic materials. The extension may be directly adhered to the housing component or otherwise coupled thereto. The extension and the housing component may be chosen to be of unlike materials to reduce or eliminate amplification of vibrations. The extension is designed for manufacturability in that it can be formed by extruding a material in the desired shape onto a housing component, the material being one that will adhere itself to the housing component. Alternatively, the extension may be attached to the housing component by a separate adhesive.

These and other features and advantages of the present invention will be evident from perusal of the following description and drawings.

DETAILED DESCRIPTION

Practical applications of the solution provided by the present invention will be illustrated with reference to a disc drive, although it will be understood that the solution can be applied to other electronic devices.

Figure 1:
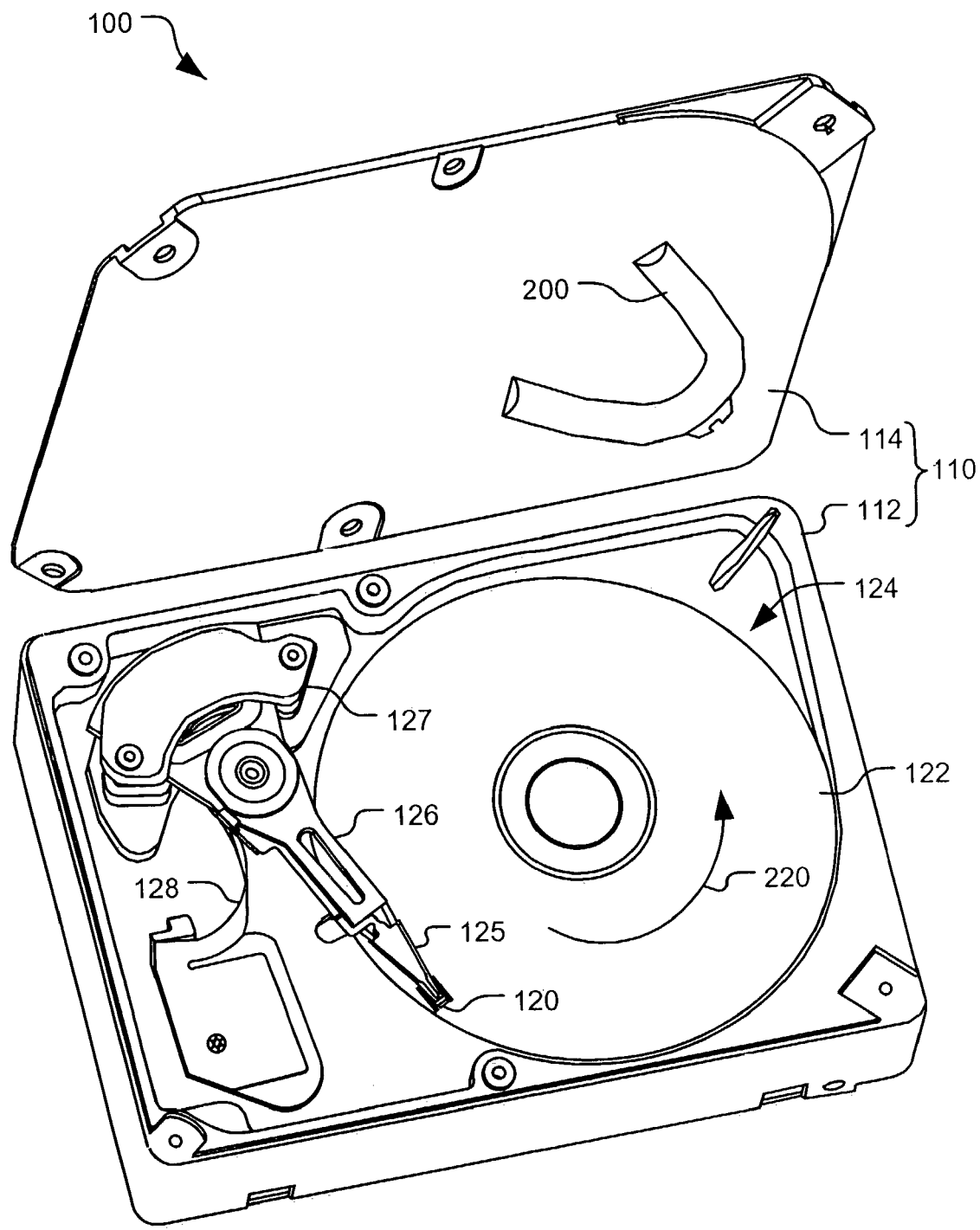
FIG. 1 is a perspective view of an exemplary disc drive incorporating one embodiment of the present invention.

FIG. 1 shows an electronic device, such as a data storage device 100, with its housing 110 taken apart to reveal the components therein. The housing 110 may be formed from a few components, for example, a base deck 112 and a cover 114, both configured to mate upon assembly to form a sealable enclosure. The housing may be made from different materials, for example, steel, aluminum or plastic. Much of the drive operations may be controlled by circuitry found on a printed circuit board assembly that is attached to the base deck.

In the disc drive, data is written to and read from disc-shaped media by read/write heads 120. One or more discs 122 may be mounted to a motor to form a disc stack assembly 124 that rotates during drive operations. The read/write heads 120 are supported by a suspension 125 that extends from an actuator arm 126. A voice coil motor 127 is used to move the actuator arm 126 and thus position the read/write heads 120 with respect to the desired position on the disc. Communications between the read/write heads and the circuitry on the printed circuit board assembly may be effected through printed circuit cables 128 whose flexibility allow for the movement of the various mechanical components.

During drive operations, there is also movement of the air or fluid within the housing 110. This may be more pronounced in the vicinity of the disc stack assembly 124 as the disc stack assembly may drag the surrounding fluid into motion with its own rotation. A disc drive may include one or more extensions that project internally into the enclosure from the housing, into the path of fluid flow. There are numerous applications for such extensions. For example, an extension may act as a guide to channel fluid flow towards a filtration unit so as to improve the efficiency of the filtration unit. In some drives, an extension may serve as a flow diverter for directing fluid flow away from certain components, particularly components that may be vulnerable to flow-induced resonant excitation such as the read/write heads. Also envisioned are extensions that are configured to encourage laminar flow or to prevent turbulent flow from developing. Such extensions may aggravate acoustic emissions from the disc drive because any transfer of kinetic energy from the fluid flow to the extension may create flow-induced vibrations in the extension, possibly causing the whole extension to engage in resonant vibration. The vibrations may be further amplified when transmitted to a plate-like housing component. However, this difficulty may be surmounted by an application of the present invention. In comparison with a conventional flow guide, it is found that an extension or a flow guide 200 of the present invention can provide a reduction in audible noise of as much as 2 to 3 decibels.

Figure 2:
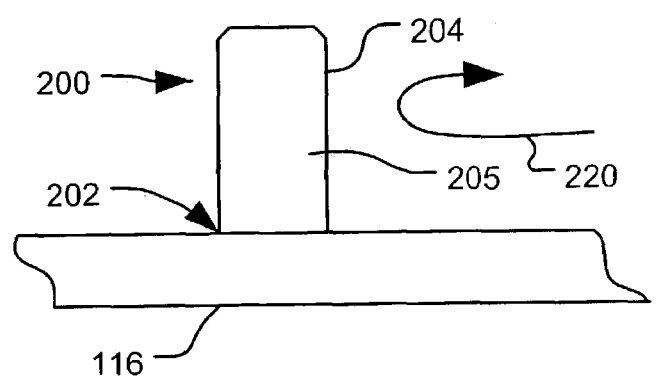
FIG. 2 is a schematic diagram illustrating one embodiment of the present invention.

According to an embodiment of the present invention, the extension 200 is essentially made from a soft or elastic material that is characterized by good damping properties. As illustrated in FIG. 2, the extension 200 includes an elastic surface 204 that is designed to be exposed to fluid flow 220. Depending on the shape and position of the elastic surface 204 relative to the fluid flow 220, the fluid may flow alongside the elastic surface 204 or it may impinge on the elastic surface 204 at some angle. The elastic wall 205 absorbs any transfer of kinetic energy from the fluid flow 220 to the extension, and any remaining energy is translated into vibrations of the whole extension 200. In some embodiments, the extension 200 is a, single mass of elastic material providing a sufficient thickness of elastic material for adequate dampening.

The extension 200 includes an elastic wall 205 in contact with an adjoining part 116 of the housing so that the interface 202 between the extension 200 and the adjoining part 116 of the housing is made up of unlike materials. The discrete interface 202 further hinders transfer of any residual kinetic energy in the extension 200 to the housing 110. This eliminates the need for an additional damper to be inserted, for example, between the extension and the housing, and enables savings in inventory and manufacture.

Embodiments of the present invention can be implemented at low cost to the manufacturer. In one aspect, there are available many commercially available materials that can be used to form the extensions 200. To name but a few examples, such materials may include elastomers, polyurethane, and butyls. The manufacturer is therefore not constrained to the use of expensive materials, but is able to select a material that best suits his budget for the degree of damping required.

Figure 3:
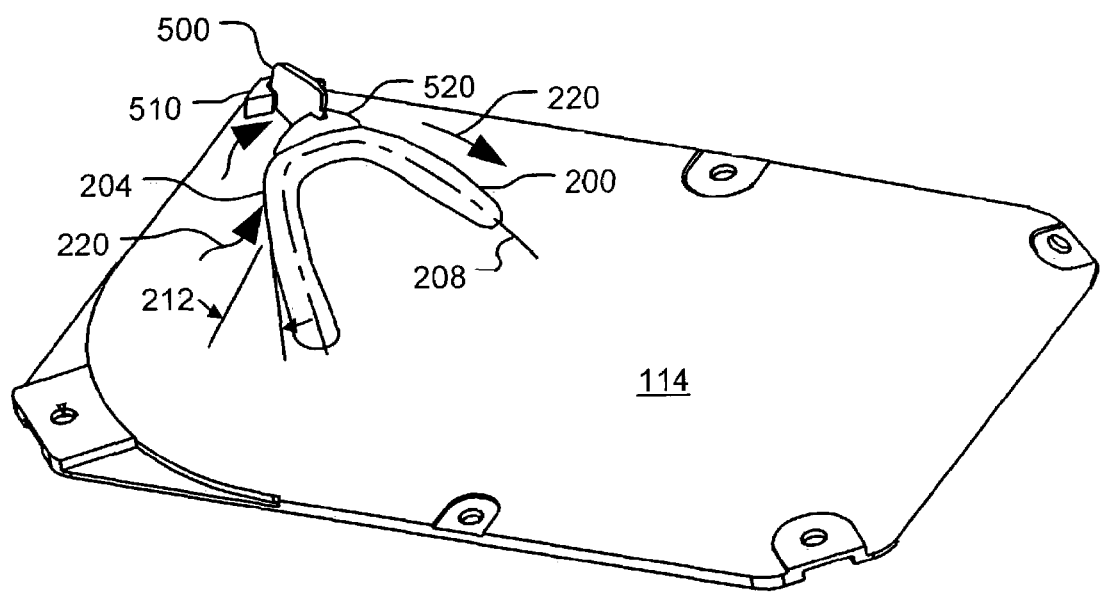
FIG. 3 is a perspective view of a housing component according to an embodiment of the present invention.
Figure 4:
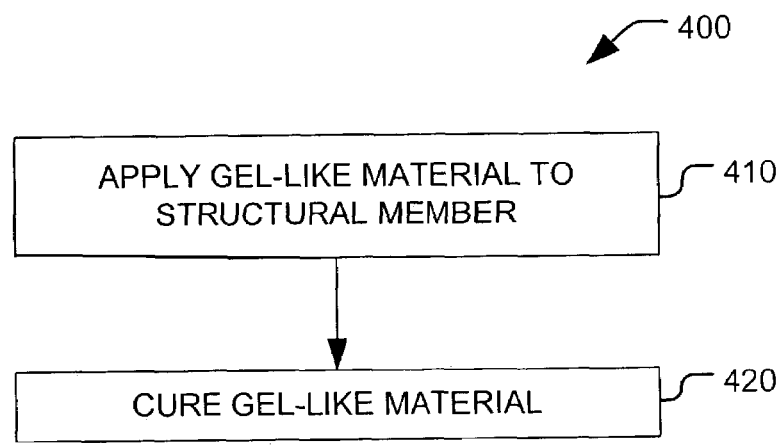
FIG. 4 is a flowchart detailing a method of forming the extension.

In another aspect, the extension 200 can be easily formed during manufacture by a process that lends itself to automation, thereby providing the manufacturer with an avenue for improved yields at low cost. One preferred method 400 of forming the extension of FIG. 3 is outlined below with the aid of the flowchart of FIG. 4, although it will be understood that there are other ways of making an extension 200 of the present invention.

An elastic polymer that is stable in the drive operating temperature range is selected to form the extension. One example of a suitable polymer is a polymer that is traditionally used to make form-in-place gaskets. The pre-polymer or a gel-like form the polymer is extruded onto an upturned cover 114 (step 410), following a path 208 determined by the desired shape of the extension. The gel-like material is then allowed to cure (step 420). Once cured, the polymer adheres to the cover. In other words, the extension is securely attached to the cover even as it is formed. An extension 200, specifically a flow guide, is thereby formed from the deposited polymer itself. The cover with the attached flow guide can then be used for assembly with the other parts of the disc drive.

Other features can also be incorporated into an extension or flow guide 200 by this method. For example, if it is desired that the surface 204 presented by the extension 200 to direct the fluid flow not deviate from the general direction of the impinging fluid flow 220 by more than 45 degrees, this maximum angle of attack 212 can be set by appropriate shaping of the elastic surface 204, which in turn can be controlled by controlling the relative motion of the extrusion and the supporting housing member, or the shape of the extrusion. It would be relatively easy for a manufacturer to use the same equipment to make extensions of different shapes and sizes to suit different applications simply by changing parameters of the extrusion process, without having to commission new molds or machine components. This method of manufacture is thus significantly more flexible and better suited for low cost manufacture of rapidly changing product lines.

Figure 5:
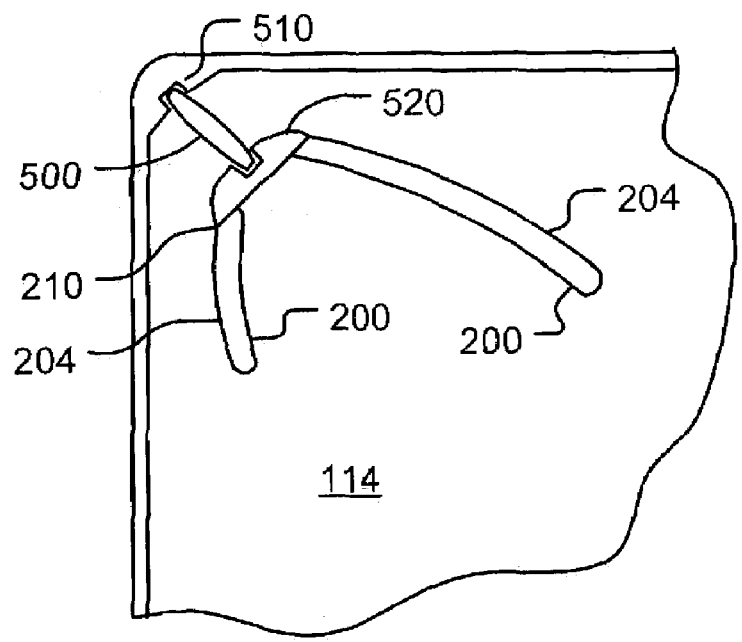
FIG. 5 and FIG. 6 are top views of alternative embodiments.

It can further be appreciated that this method, 400 allows one to produce an extension 200 that is in such close abutment 210 with an adjacent structure 520 that there is no gap between the extension and the adjacent structures. FIG. 5 shows an example where the extension 200 is a flow guide that is incorporated with the cover 114 of a disc drive. The flow guide is designed to facilitate maximum fluid flow through the filter 500. In this example, the filter 500 is held in place by filter supports 510, 520. There is preferably no leakage of fluid between the extension 200 and the filter support 520. This can be achieved by applying the gel-like material directly to both the filter support 520 and the cover 114. The adhesive nature of the gel-like material will ensure that the extension 200 mates well with both the cover 114 and the filter support 520, leaving no gaps between the components. In similar fashion, embodiments of the present invention can be applied to provide the required physical barrier in a variety of situations.

Figure 6:
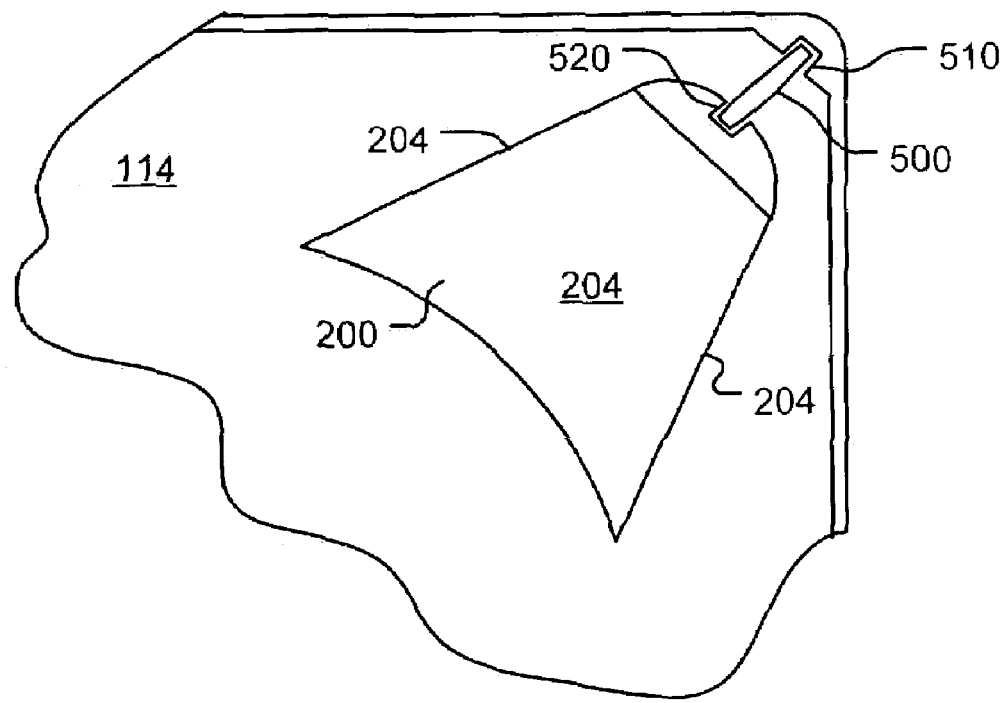

Although the above example involves extruding an extension directly on part of a housing, the present invention does not preclude the use of pre-formed parts. For example, the extension of FIG. 6 may be molded in a separate process and subsequently attached to part 116 of the housing using an epoxy adhesive. Being wholly made of one or more elastic materials, the extension 200 provides effective damping of vibrations superior to extensions that are made of a hard material. This is because the amount of damping provided by a thin layer of epoxy between a hard extension and the housing is expected to provide comparatively less damping of such flow induced vibrations.

Figure 7:
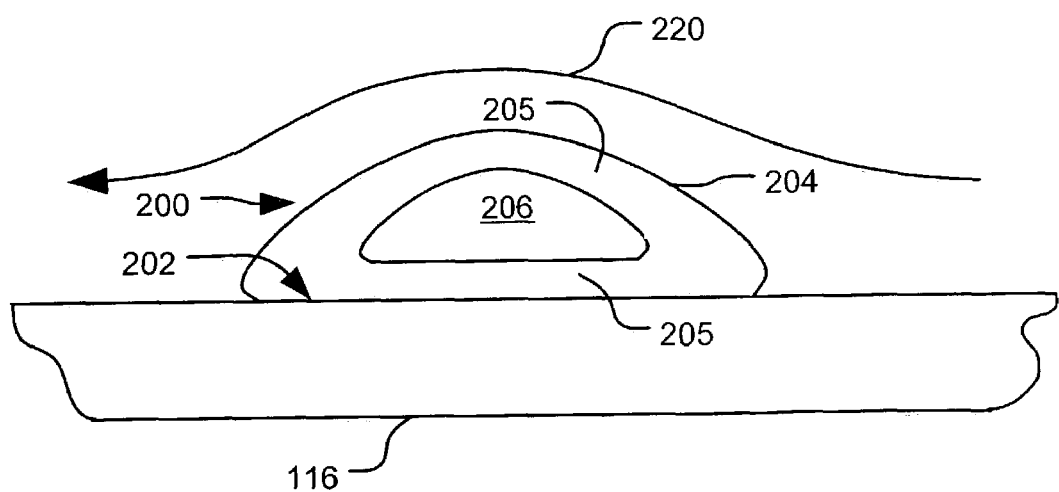
FIG. 7 is a cross-sectional view of another alternative embodiment.

In the above examples, the extension 200 is shown as a solid piece of a soft or elastic material. Alternative embodiments contemplated include extensions 200 that are substantially but not wholly made of some elastic material, while providing one or more elastic surfaces 204 for directing fluid flow 220. FIG. 7 illustrates a possible configuration in which the extension 200 includes an inelastic part 206 for supporting a desired shape of the elastic surfaces 204. FIG. 7 also illustrates alternate embodiments in which the extension 200 includes one or more pockets of air or other materials 206 within one or more elastic walls so as to provide a desired overall elasticity for the desired dampening effect. The interface 202 between the extension 200 and the adjoining housing portion 116 is defined by two dissimilar materials, one of which is sufficiently elastic to absorb any flow-induced vibrations so that such vibrations are not transferred to the adjoining housing portion 116.

Alternatively described, embodiments of the present invention include a housing component (such as 112, 114) that has a structural member (such as 114, 116), as well as an extension (such as 200) which projects from the structural member, with the extension having an elastic wall (such as 205).

In some embodiments, it can be said that the elastic wall (such as 205) includes an elastic surface (such as 204) that has at least one part that faces away from the structural member (such as 114, 116). Part of the elastic surface (such as 204) may be in contact with the structural member (such as 114,

116). Further, there may be an interface (such as 202) of unlike materials between the extension (such as 200) and the structural member (such as 114, 116).

The extension (such as 200) may essentially consist of an elastic material. The extension (such as 200) may be directly adhered to the structural member (such as 114, 116), or an adhesive may be used to join the extension (such as 200) to the structural member (such as 114, 116).

Embodiments of the present invention may further include a housing (such as 110) for an electronic device (such as 100). The housing (such as 110) includes the aforementioned housing component (such as 112, 114) in assembly with at least one other housing element (such as 112, 114) to form an interior into which the extension (such as 200) projects.

Embodiments of the present invention may also include a data storage device (such as 100) that has a disc stack assembly (such as 124) rotatably mounted to the aforementioned housing (such as 100) such that when the disc stack assembly is in rotation, fluid flow (such as 220) generated in the interior of the housing is directed by the extension (such as 200). The data storage device (such as 100) may further include a filtration unit (such as 500) in the interior of the housing, with the extension (such as 200) configured to direct fluid flow (such as 220) to or from the filtration unit.

According to other embodiments of the present invention, there is provided a method (such as 400) of forming the aforementioned housing component (such as 112, 114). The method (such as 400) includes steps of (a) (such as 410) applying a gel-like material to the structural member, and (b) (such as 420) allowing the gel-like material to cure and form the extension. The applying step (a) (such as 410) may involve extruding the gel-like material onto the structural member. Alternatively, the method (such as 400) of forming the aforementioned housing component (such as 112, 114) includes steps of (a) providing a molded elastic extension (such as 200) and (b) attaching the extension (such as 200) to the structural member (such as 114, 116).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the shape, size and function of the extension 200 may vary depending on the particular application for the consumer product without departing from the scope and spirit of the present invention. In addition, although the embodiments described herein are directed to a disc drive or a data storage device, it will be appreciated by those skilled in the art that the teachings of the present invention can be applied to other electronic devices without departing from the scope and spirit of the present invention.

What is claimed is:

1. An enclosure comprising:
   a housing; and
   an airflow guide enclosed in the housing, wherein the airflow guide projects from the housing in an air flow path created within the housing, in which the airflow guide comprises an elongate elastomeric body forming a barrier surface that is non permeable to air flow along an elongate length of the elastomeric body to guide the air flow in a desired path.

2. The enclosure of claim 1 in which a portion of the elastomeric body is formed directly in place to the housing.

3. The enclosure of claim 1 in which the elastomeric body of the airflow guide essentially consists of one of a polyurethane or butyl material.

4. The enclosure of claim 1 wherein the housing includes a base deck and a cover and the airflow guide is formed in place to the cover.

5. The enclosure of claim 1 further comprising an adhesive joining the airflow guide to the housing.

6. A data storage device comprising:
   a housing;
   a fluid flow region within the housing; and
   an airflow guide that projects into the housing and comprises an elastomeric body forming a barrier surface in the fluid flow region that is non permeable to fluid flow along a length of the elastomeric body to guide the fluid flow in a desired path.

7. The data storage device of claim 6, further comprising an interface between the airflow guide and the housing which consists of unlike materials.

8. The data storage device of claim 6 wherein the elastomeric body is formed in place to the housing of a curable gel-like material.

9. The data storage device of claim 6 wherein the housing includes a base deck and a cover and the airflow guide is formed in place directly to the cover.

10. The data storage device of claim 6 further comprising a filtration unit in an interior of the housing wherein the filtration unit includes first and second filter supports to support a filter between the first filter support and the second filter support and the air flow guide is formed to the first filter support and the second filter support is spaced from the first filter support and the non-permeable barrier surface of the airflow guide is configured to direct fluid flow to or from the filter of the filtration unit.

11. The data storage device of claim 6 wherein the airflow guide is spaced from a voice coil motor enclosed within the housing.

12. The data storage device of claim 6 and comprising a first filter support and the elastomeric body is extruded on the first filter support and a second filter support spaced from the first filter support to support a filter between the first and second filter supports.

13. The enclosure of claim 1 wherein the elongate elastomeric body is formed in place of a curable gel material.

14. The data storage device of claim 6 wherein the elastomeric body comprises a formed in place gasket material.

15. The data storage device of claim 6 wherein the elastomeric body is extruded in an elongate "U" shaped pattern to form a "U" shaped body portion on the housing.

16. The data storage device of claim 6 wherein the housing includes a base deck and a cover and the air flow guide is formed directly to a filter support of a filtration unit and the cover.

17. The data storage device of claim 6 wherein the elastomeric body is formed in place of a patterned extrusion of elastomeric material.

18. An assembly comprising:
   a cover portion connectable to a base portion; and
   an air flow guide formed on the cover portion comprising an elongate elastomeric body including a raised body portion formed of an extruded elastomeric material having a surface contour formed by an outer surface of the extruded elastomeric material.

19. The cover assembly of claim 18 wherein the elongate elastomeric body includes a curvilinear body portion and spaced leg portions extending outwardly from the curvilinear body portion.

20. The data storage device of claim 12 wherein the air flow guide includes a first elastomeric body portion formed directly to a first edge portion of the first filter support to form an inlet portion and a second elastomeric body portion formed directly to a second edge portion of the first filter support to form an outlet portion.

* * * * *

UNITED STATES PATENT AND TRADEMARK OFFICE
CERTIFICATE OF CORRECTION

PATENT NO. : 7,644,802 B2  
APPLICATION NO. : 10/630207  
DATED : January 12, 2010  
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 372 days.

Signed and Sealed this

Sixteenth Day of November, 2010

David J. Kappos  
*Director of the United States Patent and Trademark Office*